United States Patent Office
3,503,505
Patented Mar. 31, 1970

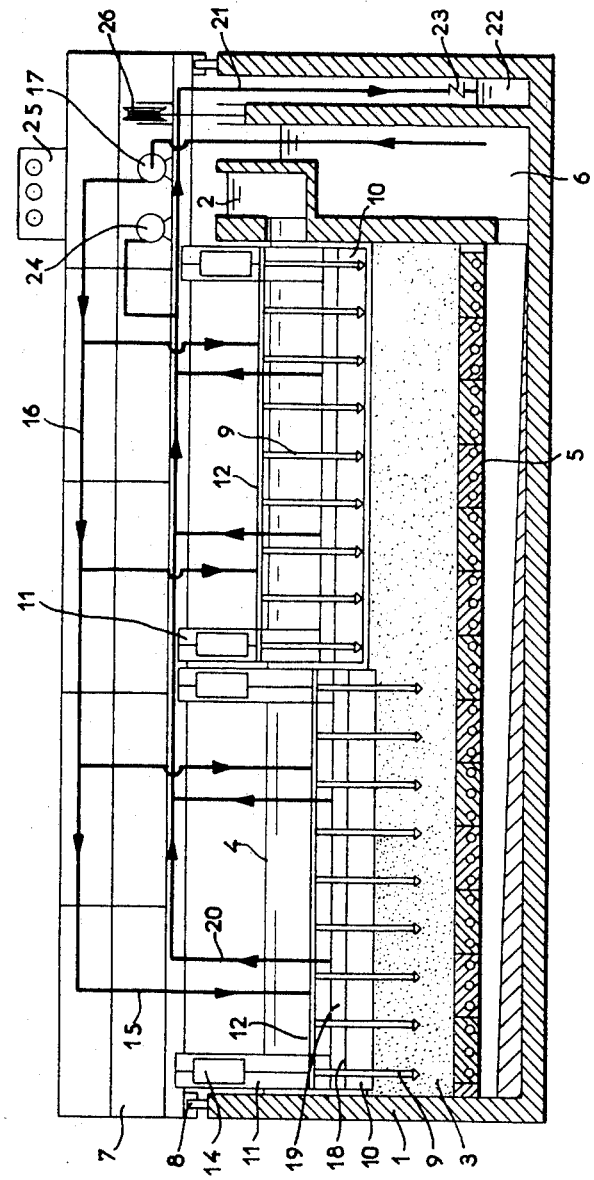

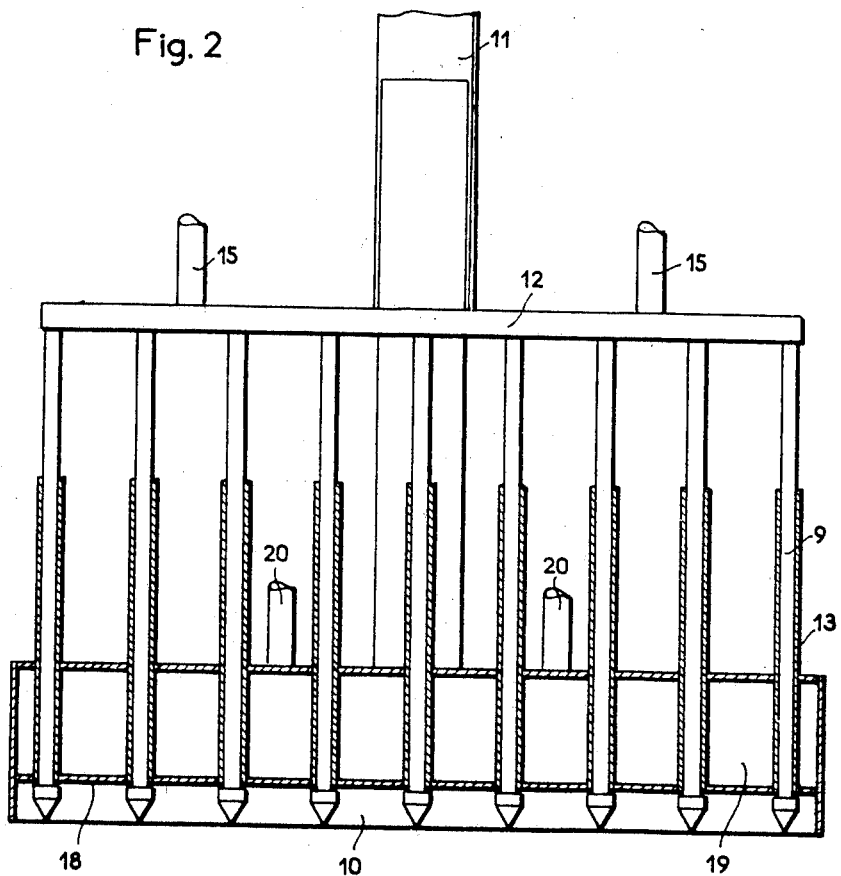
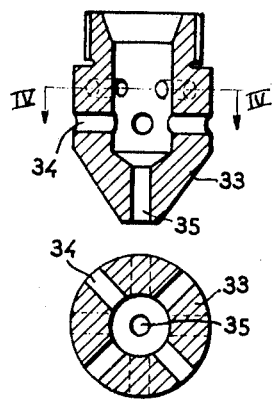

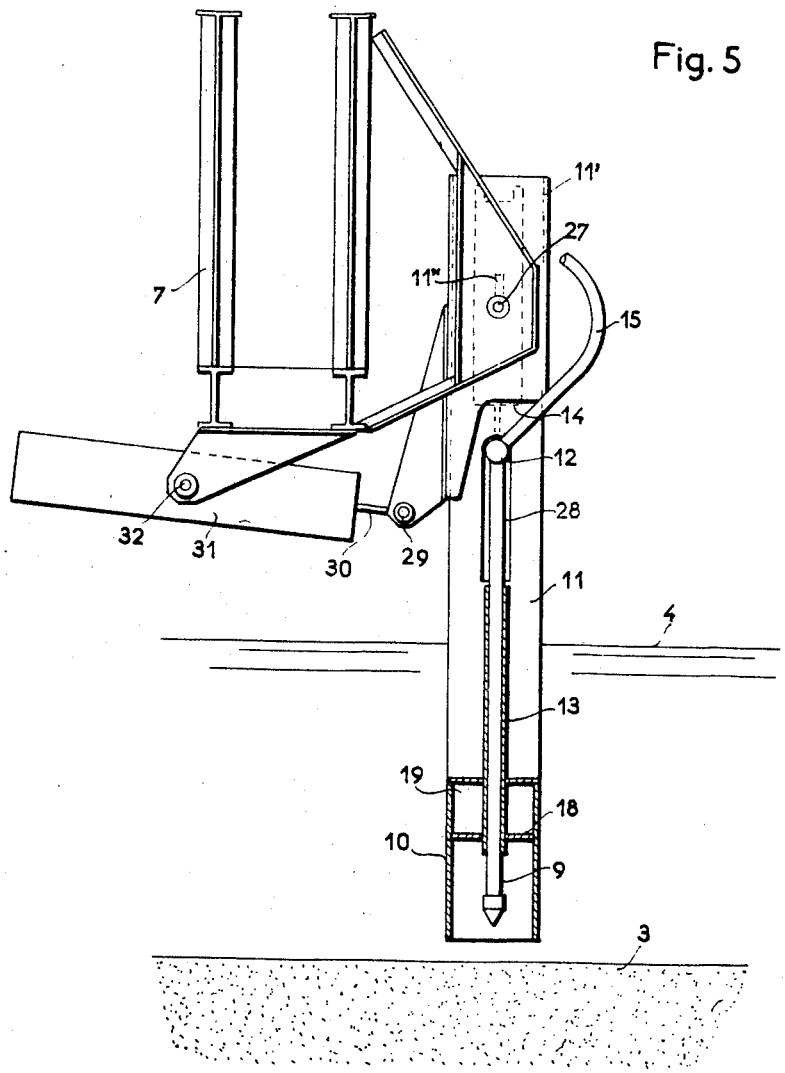

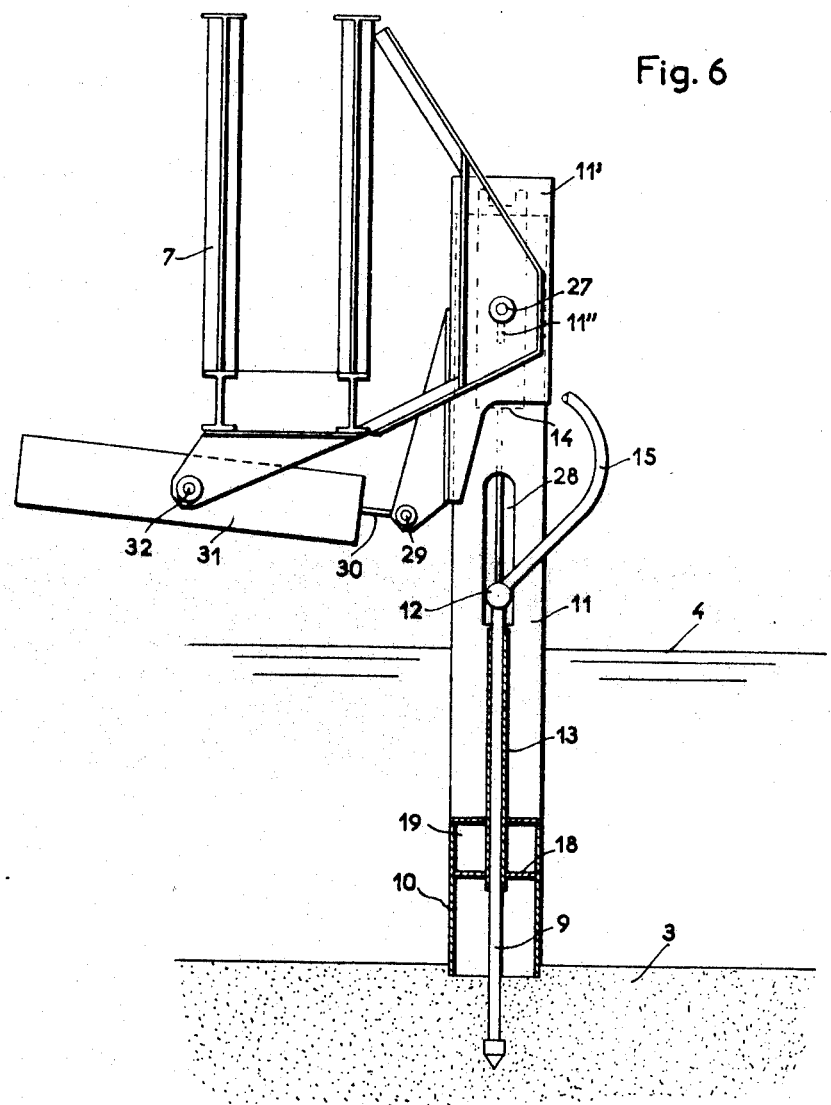

3,503,505
PROCESS FOR WASHING OPEN OR GRAVITATIONAL FILTERS FOR THE PURIFICATION OF WATER
André R. Rensonnet, Moulin de Limal, Limal, Belgium
Filed Mar. 25, 1968, Ser. No. 715,866
Claims priority, application France, Mar. 28, 1967, 100,376
Int. Cl. B01d 23/24
U.S. Cl. 210—80      1 Claim

ABSTRACT OF THE DISCLOSURE

To carry out washing of a filter, a coffer is used open downwardly which is pivotally suspended on a mobile bridge by arms capable of effecting a vertical movement limited with respect to the bridge. A series of nozzles fed by pipes traverse the coffer by guided sliding in order to inject washing water into the filtering layer to be washed, the dirty washing water being drawn off and removed by pipes at an amount superior to the amount of washing water injected by the nozzles.

---

The invention relates to the washing of open or gravitational filters for the purification of water which are formed by large basins, the bottom of which is covered by a thick filtering layer formed of a loose material, generally of sand, which it is necessary to wash periodically to remove from this layer the impurities which have clogged it progressively during the course of the operation of the filter.

This washing is usually performed by means of an arrangement supported on a mobile carriage displaceable on the emergent partitions of the filtration basin, this arrangement comprising an elongated coffer open downwardly forming a bell, in which coffer is fitted a device for the injection of washing water, which can be displaced vertically in ordes to penetrate into the filtering layer situated below the coffer, which is provided with means for drawing off and removing the dirty water containing the impurities detached from the filtering layer under the effect of washing. After washing a local zone of the filter, the washing device is lifted in order to extract it from the filtering layer and the said carriage is displaced in order to bring the arrangement above another zone of the filtering layer.

It has been established thaht the result of the washing was not perfect and experiments have allowed of determining that the impurities, remaining in the layer during washing by known means, must come from the fact that the injection of washing water must drive back the impurities from the zone under treatment towards the neighbouring zone, hence also that already subjected to washing.

According to the invention, this disadvantage is avoided owing to the fact that there is drawn off and revoved an amount of dirty water greater than the amount of the washing water injected into filtering layer.

An arrangement for carrying out the invention will now be described with reference to the accompanying drawings.

FIGURE 1 is a front view of a washing arrangement mounted in a filter bed showing in vertical section, FIGURE 2 is a view on a larger scale of a variant construction of the washing device of such an arrangement, FIGURE 3 is a view in axial section of the injection head of a washing member, FIGURE 4 is a sectional view along the line IV—IV of FIGURE 3, FIGURE 5 is a lateral view in elevation and at a greater scale of the essential members of the washing arrangement in an inactive position, FIGURE 6 is a similar view of this arrangement in an active position.

In these drawings 1 denotes the masonry delimiting the filter in which raw water for filtering arrives at 2 to pass through the filtering mass or layer 3, usually of sand, covered with water to the level 4. The filtered water is collected by a draining screen 5 and accumulates in the compartment 6. The washing arrangement is supported by a mobile carriage or bridge 7 rolling on wheels 8 on the walls emerging from the filter bed. In the example illustrated, the washing arrangement comprises two identical washing devices, each comprising nine injection nozzles 9, the right-hand device (FIGURE 1) being in the inactive position while that on the left is in the active position. It is obvious that the arrangement can comprise one or more of these devices as necessary and that the number of nozzles 9 can vary as the case may be.

Each washing device comprises a coffer 10 forming a bell open downwardly, which coffer is suspended on the carriage by two arms 11 fitted at the extremities of the coffer (FIGURE 1) or by a single central arm (FIGURE 2).

The nozzles 9 are combined into a collector tube 12 for supplying washing water, the whole constituting a harrow (9, 12). The nozzles 9 are guided in tubes 13 fixed to the coffer 10, and the harrow (9, 12) can be displaced vertically by means of two jacks 14 supported on the bridge 7 (or one jack in the case of FIGURE 2) which allows of regulating with precision the depth of penetration of the nozzles 9 into the filtering layer 3. The collector 12 is connected, for example by two flexible pipes 15, to a pipe-system 16 going to a pump 17 drawing washing water into the compartment 6.

Each coffer 10 shows, at a certain distance from its lower edge, a permeable partition 18, perforated for example, which delimits a compartment 19 forming an exit collector of dirty liquid resulting from the washing which is drawn off, for example, by two flexible extraction pipes 20 connected to a pipe-system 21 discharging into a waste drain 22 and provided with a non-return valve 23. The pipes 20–21 form a syphon, the starting of which is ensured by a vacuum pump 24. An electric control panel 25, for preference automatic, for the different operating members is mounted on the mobile bridge 7 which likewise carries a drum 26 on which can be rolled the cable or supplying electric current.

The whole should be carried out in such a way that the coffer 10 can be displaced vertically to lower it on to the filtering layer 3 and then to remove it therefrom, while the nozzles 9 should be capable of being displaced vertically with respect to the coffer and to penetrate more deeply into the layer 3 in the active position (FIGURE 6). These relative movements can be achieved by any appropriate means. A simple solution will be described by way of example. In this, the upper extremity of each arm 11 slides with respect to a part 11' joined to the bridge 7 by a pin 27 which the arm 11 surrounds by means of a slot 11'', while the jack 14 is supported by the part 11' and then by the bridge 7.

To allow of the relative movement of the coffer 10 and of the harrow 9, 12 which is connected to the mobile member of the jack 14, it is provided that in the inactive, i.e. raised, position (FIGURE 5), the whole of the coffer 10 of the arms 11 rests freely in abutment on the harrow 9, 12 and will therefore, follow the descending movement of the harrow until the coffer 10 bears on the layer 3, for example by means of an interior shoulder of the coffer, the descent of the harrow alone being then able to continue under the action of the thrust of the jack 14. The said abutment could be formed by a shoulder provided on the nozzles 9 and cooperating with the lower extremity of the tubes 13. Or else, as shown in FIGURES 5-6, a slot 28 can be provided on each arm 11 to cooperate with the collector 12 of the harrow, in such a way that the coffer 10 will be raised when, during the raising of the collector 12, the latter abuts against the upper extremity of the said slot.

Each part 11' of an arm 11 is joined by a pin 29 to the mobile member 30 of a jack 31, itself articulated at 32 to the bridge 7. These jacks 31 (a single one suffices in the case of FIGURE 2) allow of causing the parts 11' to pivot on the pins 27 taking with them the arms 11 and the harrow 9, 12 in such a way as to raise the whole to bring it into a practically horizontal position and to be able easily to displace the bridge 7 from one filter to another which it is desired to wash by means of the same arrangement.

Each nozzle 9 is advantageously provided with a head 33 (FIGURES 3-4) comprising one or more rings of peripheral orifices 34 and an axial orifice 35 which assures not only a rapid penetration into the filtering layer 3 but also effective washing thereof by jets directed in all directions.

Owing to the fact that, according to the invention, the amount of removal of dirty water by the pipe-system 21 is greaer than the amount of washing water injected by the nozzles 9, any flow-back of impurities outside the washing zone is avoided and complete removal thereof to the drain is ensured. The arrangement thus allows of perfect washing of the filter without having to interrupt filtration.

More over, the transfer of the washing arrangement from one filter to another is carried out easily and rapidly owing to the lifting by pivoting of the nozzle washing-device, so as to be able to pass above the walls of the filter basins without requiring a high supperstructure of the mobile bridge.

Of course, the invention is in no way limited to the method of embodiment described and represented: it is capable of numerous varients available to one skilled in the art according to the applications envisaged and without, on that account, going outside the spirit of the invention.

I claim:
1. A process for washing open or gravitational filters for the purification of water consisting of large basins, the bottom of which is covered by a filtering layer formed by a loose material, generally sand, in which process local zones of the filtering layer are successively washed by means of a coffer open downwardly which is lowered on to the said layer, washing water being injected into the filtering material situated under the coffer, while the dirty water resulting from the washing is extracted by suction, wherein the amount of dirty water drawn off and removed in the zone of the filtering layer subjected to washing is greater than the amount of washing water injected into that zone.

References Cited
UNITED STATES PATENTS

| | | | |
|---|---|---|---|
| 379,349 | 3/1888 | Warren | 210—272 X |
| 1,713,320 | 5/1929 | Bayard et al. | 210—273 X |
| 1,919,565 | 7/1933 | Laughlin et al. | 210—273 |

SAMIH N. ZAHARNA, Primary Examiner

U.S. Cl. X.R.
210—81, 273